United States Patent
Nijim et al.

(10) Patent No.: US 10,419,806 B1
(45) Date of Patent: Sep. 17, 2019

(54) MODULARLY ACTIVATED CLOUD-DVR STORAGE

(71) Applicant: Cox Communications, Inc., Atlanta, GA (US)

(72) Inventors: Yousef Wasef Nijim, Cumming, GA (US); James Alan Strothmann, Johns Creek, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 0 days.

(21) Appl. No.: 15/191,468

(22) Filed: Jun. 23, 2016

(51) Int. Cl.
*H04N 21/4147* (2011.01)
*H04N 21/4335* (2011.01)
*H04N 21/258* (2011.01)
*H04N 21/45* (2011.01)

(52) U.S. Cl.
CPC ... *H04N 21/4147* (2013.01); *H04N 21/25891* (2013.01); *H04N 21/4335* (2013.01); *H04N 21/4532* (2013.01)

(58) Field of Classification Search
CPC ........... H04N 21/2401; H04N 21/4147; H04N 21/4335
See application file for complete search history.

(56) References Cited

U.S. PATENT DOCUMENTS

| | | | | |
|---|---|---|---|---|
| 2002/0174430 | A1* | 11/2002 | Ellis | G11B 27/005 725/46 |
| 2009/0100478 | A1* | 4/2009 | Craner | G11B 19/00 725/87 |
| 2010/0217613 | A1* | 8/2010 | Kelly | G06Q 30/02 705/1.1 |
| 2010/0287580 | A1* | 11/2010 | Harding | G06Q 30/0247 725/14 |
| 2011/0052157 | A1* | 3/2011 | Pickelsimer | H04N 5/76 386/295 |
| 2011/0225617 | A1* | 9/2011 | Rakib | H04N 21/462 725/109 |
| 2013/0268335 | A1* | 10/2013 | Cooper | G06Q 30/0217 705/14.19 |
| 2013/0346537 | A1* | 12/2013 | Fitzpatrick | H04L 67/1097 709/213 |
| 2014/0143816 | A1* | 5/2014 | Compton | H04H 60/27 725/88 |
| 2014/0153907 | A1* | 6/2014 | Farah | H04N 9/7921 386/297 |
| 2017/0061486 | A1* | 3/2017 | Cheng | G06Q 30/0257 |

* cited by examiner

*Primary Examiner* — Junior O Mendoza
(74) *Attorney, Agent, or Firm* — Merchant & Gould

(57) ABSTRACT

The modular assignment of storage space provides consumers with greater access to cDVR systems and to more efficiently allocate storage within the cDVR system. When a record command is received, it will be determined whether sufficient storage space is available to the consumers. When it is determined that the consumer does not have enough storage space to record the content item in the cDVR system, additional storage space may be allocated modularly to the consumer. Consumers will select how storage space is to be modularly allocated for their use (either via preset options or at the time or recording) and the service provider or operator of the cDVR will provide the set amount in accordance with the consumer's preferences.

20 Claims, 5 Drawing Sheets

MODULARLY ACTIVATED CLOUD-DVR STORAGE

BACKGROUND

Consumers of television services greatly enjoy being able to record linear content items to re-watch content items after an initial time of broadcast or to shift when they view specific content items to a more convenient time. Consumers, however, do not always have access to hardware capable of recording linear content items in their homes, such as a Digital Video Recorder (DVR), and may instead use cloud-based Digital Video Recorders (cDVR) to store content with a service provider. Recording content items on a cDVR offers the added benefits for consumers that no bulky equipment (or less bulky equipment) needs to be installed or maintained in the home and that the recorded content may be accessed on the go or from multiple locations. For example, a consumer may have recorded content on a cDVR and may access that content while on vacation, travelling to work, or otherwise away from the home.

Content providers, however, try to limit the amount of storage consumers use from the cDVR service, and thereby reduce the amount of hardware that must be maintained to provide the cDVR system. For example, different tiers for subscriber accounts may limit the amount of storage available to consumers, auto-delete policies or prompts to delete viewed content may be provided to limit the use of storage space. These solutions are often arbitrary and result in the misallocation of computer-readable storage media, consumer frustration, and excess data transmission. For example, a consumer may be assigned a block of storage, but never use that storage to its capacity, thus wasting resources. In another example, the content provider may transmit requests to prompt the consumer to delete older or already viewed recorded content, which the consumer ignores or responds to in the negative (i.e., do not delete the referenced recording), which uses bandwidth and may frustrate the consumer after repeated requests.

SUMMARY

Aspects of the present disclosure provide for systems and methods to provide consumers and service providers with an improved recording experience in a cDVR (cloud Digital Video Recorder) system via triggering modular storage allocation in the cDVR. Instead of or in addition to assigning consumers or subscribers blocks of storage in a cDVR system, a service provider may, upon receiving a record command, determine how to assign storage space modularly for the specified content item. Resources are applied or shifted for the allocation of storage space based on consumer preferences which may be set at the time a recording request is made.

By placing the determination of how to obtain the storage space at the step of recording, instead of just at the step of viewing or via account setup or management options, the service provider may reduce the amount of transmissions required to manage cDVR storage space and the amount of storage space needed for consumers. The consumers, in turn, may adjust storage policies on the fly to meet needs and desires for specific content items. The present disclosure thus improves the operation and efficiency of the systems described herein and the user experience thereof.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein elements are not to scale so as to more clearly show the details and wherein like reference numbers indicate like elements throughout the several views.

DETAILED DESCRIPTION

As briefly described above, aspects of the present disclosure provides consumers and service providers with an improved recording experience in a cDVR (cloud Digital Video Recorder) system via triggering modular storage allocation in the cDVR.

By providing consumers greater control over how storage resources are allocated for recording content, service providers can realize savings in network bandwidth and hardware maintenance and acquisition for the storage of consumer-recorded content, while providing the consumers an enhanced user experience that is more flexible and less aggravating that previous systems and methods.

Figure 1:
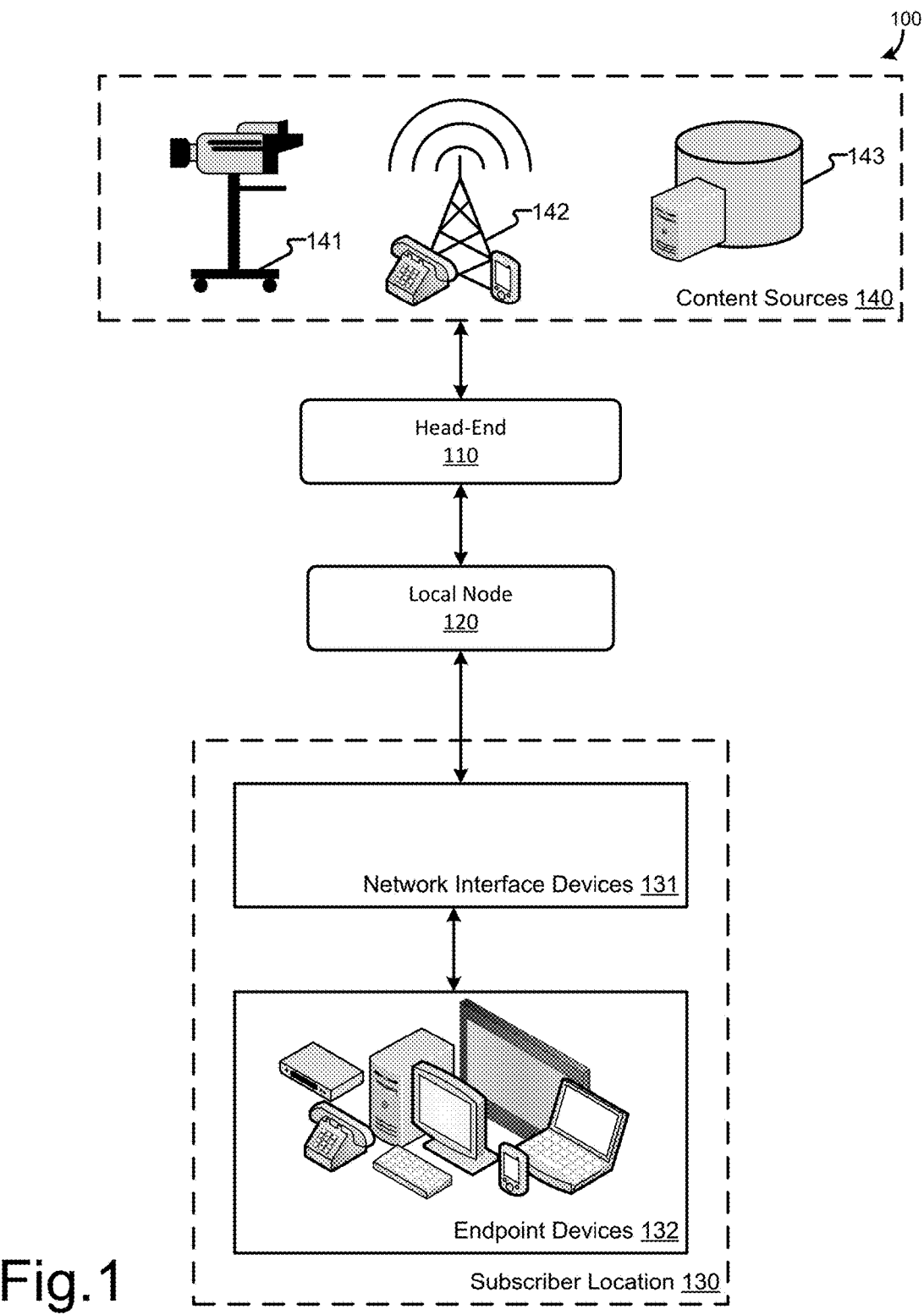
FIG. 1 illustrates an example Content Delivery Network with which the present disclosure may be practiced.

FIG. 1 illustrates an example Content Delivery Network (CDN) 100 with which the present disclosure may be practiced. Services originate at a head-end 110, which distributes services to local nodes 120, which in turn serve subscriber locations 130. The CDN 100 provides tiers of caching and processing, from which data are requested and transmitted over a physical network (which may include wired and wireless components), enabling the distribution of data and services for quick access by consumers at lower levels of the tier from higher levels of the tier where the content originates. Content may remain cached at a given level in the tier of the CDN 100 according to a Time to Live (TTL) value associated with the content and/or the tier to allow for the redistribution of content to lower tiers without requiring it to be delivered again from a higher tier. The content will expire according to its TTL value so that the CDN 100 may reclaim the storage space used to cache that content item. Services include, but are not limited to cable television service, internet service, and telephone service, and one consumer may be provided with one or more services by the service provider over the CDN 100.

The CDN 100 illustrated in FIG. 1 represents components that may be used in conjunction with a Hybrid Fiber-Coaxial (HFC) network or other physical network used to link subscriber locations 130 with content sources 140 to provide content (generally referred to herein as the HFC network). Content sources 140 include television stations 141, telephone networks 142, and content databases 143. Television stations 141 include local broadcast stations, cable network stations, satellite network stations, and governmental agencies that piggyback on television signals to provide alerts (e.g., the National Weather Service, the Department of Justice (AMBER alerts), the Federal Emergency Management Agency). Telephone networks 142 include wireless networks, such as mobile phone cells in a cellular telephone network, as well as wired networks, such the trunk lines between cell towers and/or telephone exchanges. Content databases 143 include local content databases, such as the servers used by the service provider to store and provide VOD content or a cDVR system (discussed in greater detail in regard to FIG. 2), and remote content databases, such as those provided via the Internet or by other service providers. In various aspects, the content sources 140 are provided by the same entity that maintains the CDN 100, while in other aspects, the CDN 100 may be maintained by a different entity. For example, a first cable service provider may maintain a CDN 100 and several content databases 143, but a consumer may access stored content from a different cable service provider's content databases 143 over the CDN 100 of the first cable service provider.

The head-end 110 is in communication with the local node 120 via fiber optic cables, and the local node 120 is in communication with the subscriber location 130 via fiber optic cables (when fiber to the premises (FTTP) is installed), coaxial cables, telephone lines, or radio waves (e.g., cellular signals, Wi-Fi, WiMAX). Similarly, the head-end 110 may be in communication with the content sources 140 via various transmission media, including, but not limited to, fiber optic cables, coaxial cables, telephone lines, and radio waves.

Although, for purposes of simplicity, only one local node 120 and one subscriber location 130 are illustrated in FIG. 1, one of ordinary skill in the art will understand that a head-end 110 may be in communication with multiple local nodes 120 and each local node 120 may be in communication with multiple subscriber locations 130. One of ordinary skill in the art will also recognize that a head-end 110 may be implemented in a single office or facility, or in a ring of multiple offices or facilities that act as distributed hubs of the head-end 110, which may be in communication with each other via fiber optic cables or radio waves, such as, for example, microwave transmissions.

At the subscriber location 130, services are received from the local node 120 by network interface devices 131, such as, for example, cable modems, set top boxes (STB), cable cards, and Voice over Internet Protocol (VoIP) telephone interfaces. A network interface device 131 interfaces between the local node 120 and endpoint devices 132, and may convert signals comprising the services from one transmission medium to another transmission medium (e.g., between coaxial cable, Ethernet cable (category-6, category-6e, etc.), telephone cable (RJ11, RJ14, etc.), and radio waves), translate signals between encapsulation modes (e.g., shift signals to heterodynes, change signal standards, change modulation schemes), cache or buffer data for burst transmission, apply forward error correction, and route signals to the appropriate endpoint devices 132.

Endpoint devices 132 are devices used by consumers to consume content delivered over the CDN 100, such as, for example, televisions, Digital Video Recorders (DVR), computers (including desktops, laptops, tablets, netbooks, personal media servers, video game systems, etc.), landline phones (e.g., VoIP consoles, Plain Old Telephone Service (POTS) consoles), mobile phones, fax machines, networked printers, internet radios receivers, etc. In various aspects, endpoint devices 132 may incorporate network interface devices 131, such as, for example, a combination STB and DVR or a cellphone with a network interface.

Commands from a consumer may be sent to the network interface devices 131 or the endpoint devices 132 via integrated controls (e.g., buttons, switches, knobs, and touch screens), wired devices in communication with the device (e.g., wired keyboards, mice, and console controllers), and wireless control devices in communication with the device (e.g., remote controls, wireless keyboards, mice, and console controllers). In various aspects, wireless control devices may be associated with one network interface device 131 or endpoint device 132, or may be associated with multiple network interface devices 131 and/or endpoint devices 132 (e.g., a universal remote control) serially or simultaneously in communication with multiple devices.

Television services delivered over the CDN 100 may multiplex several different content items for concurrent transmission over shared transmission media. In a radio frequency television (RFTV) implementation, each television station 141 is assigned a frequency or wavelength on which its content is transmitted, whereas in an internet protocol television (IPTV) implementation, each subscriber location 130 is assigned a frequency or wavelength on which content specific to that subscriber location 130 is delivered. As will be understood, when a consumer changes channels under RFTV, a tuner in a network interface device 131 or an endpoint device 132 changes the frequency to which it is tuned, whereas when a consumer changes channels under IPTV, a request is sent to the local node 120 or head-end 110 to encapsulate the content of the newly requested channel in a stream of internet protocol (IP) packets that are delivered to the consumer. In an IPTV implementation, due to the distance between the consumer and the service provider, navigation requests (of menus or of content) may introduce lag or delays from the time of request to the time of delivery for content requested by a consumer.

As one of ordinary skill in the art will understand, the CDN 100 will include various computer devices, which are used to manage and control the provision of service via the HFC network. For example, the encoding of a telephone call may be managed by a computer controlling the On-Off Keying (OOK) of a laser diode over a fiber optic transmission medium. Computers used in the CDN 100 include processors and memory storage devices, which store instructions that when executed by the processors enable the provision of services. Memory storage devices are articles of manufacture that include computer-readable storage media. The term computer-readable storage media does not include transmission media, but refers to hardware media used to store desired information for access by a computer. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

Figure 2:
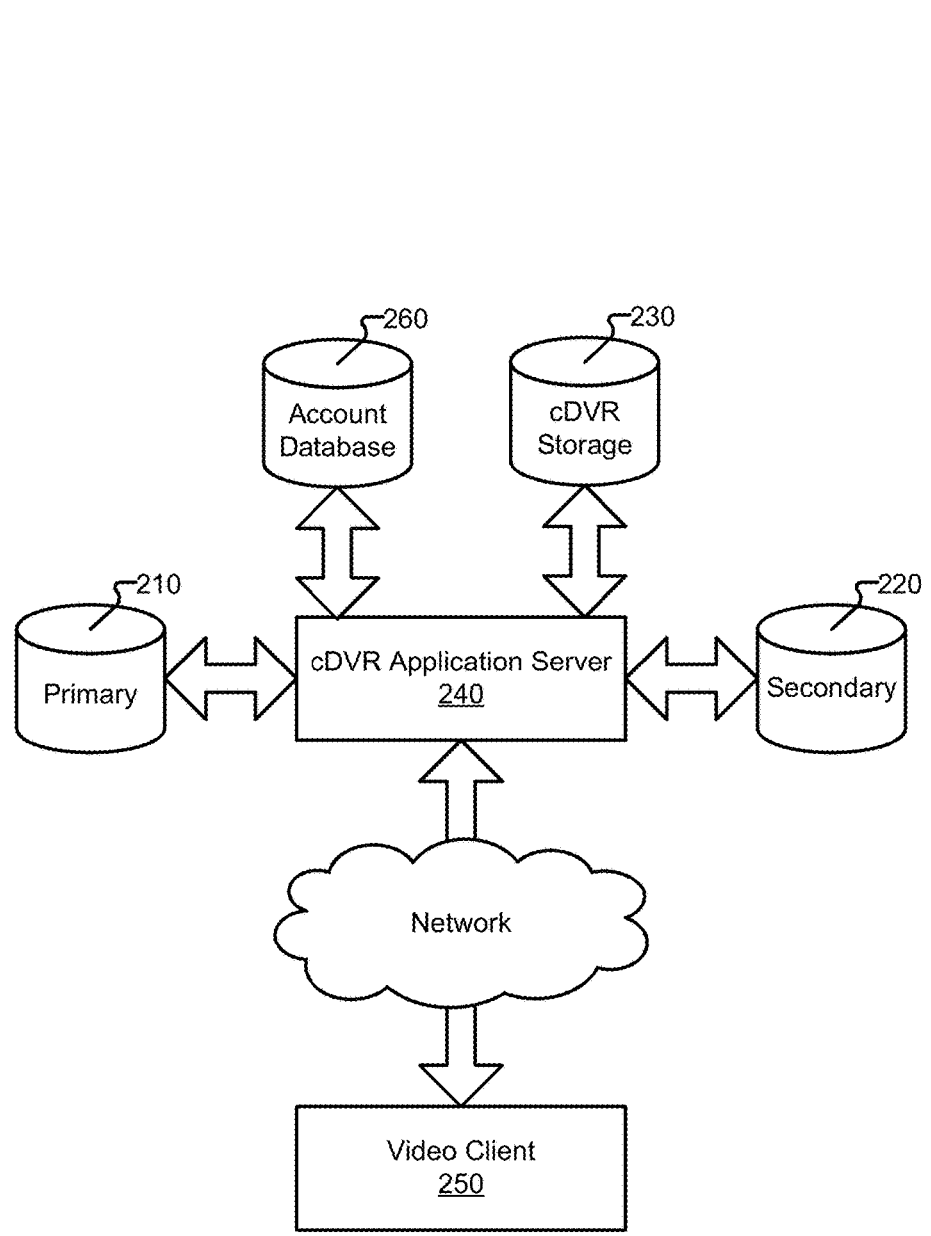
FIG. 2 illustrates an example block diagram of an improved cDVR system.

FIG. 2 illustrates an example block diagram of an improved cDVR system 200. Recorded content is delivered via a network, which may include a CDN 110 such as that illustrated in FIG. 1, to a video client 250. The video client 250 is operable to receive content, make requests for access to content, and transmit trick play commands related to content stored by the cDVR system 200. The requests are handled via the network by a cDVR application server 240, which accesses primary content sources 210, secondary content sources 220, and the cDVR storage 230 to record and recall content for the consumer using the video client 250. A given consumer may access the cDVR system 200 via more than one video client 250, and multiple consumers may access the cDVR system 200 via the same video client 250, and their account information (access permissions, parental policies, storage space, recording and retention preferences) may be accessed from the account database 260. For example, a first client may access the cDVR system 200 via two STBs running different video clients 250. Alternatively or in addition, a first consumer may log into a video client 250 with an associated profile and then log out for a second consumer to log into the video client 250 with a different associated profile.

The primary content source 210 includes linear and non-linear content available to the consumers via the service provider. For example, the broadcasts of television programs carried via the content provider's CDN 100, which may be temporarily spooled on computer-readable storage media or directly transmitted over the physical network, from television networks are included as primary content sources 210. As will be appreciated in a CDN 110, content that is described as "broadcast" will include content that is unicast (e.g., from a source to a caching location, between caching locations, and from a caching location to a consumer) as linear content.

The secondary content source 220 includes linear and non-linear content available to the consumers via the service provider that is provided in addition to or over the top of primary content. For example, secondary content sources 220 include the National Weather Service, the Emergency Alert System, and other providers of alerts to consumers for dangerous conditions. In some aspects, secondary content sources 220 may also include advertisement servers (operated by the service provider or a third party), from which advertisements may be pulled for insertion into a content item. In yet other aspects, the secondary content sources 220 may include a service provider server, operable to provide the consumer with secondary content of messages from the service provider, such as for example, network condition messages, news alert messages, weather forecast messages, etc.

In various aspects, content from the secondary content source 220 is inserted into the primary content (e.g., an Amber alert that interrupts a broadcast), overlaid over the delivered primary content (e.g., a school closings news ticker displayed over a portion of a broadcast), adjusts an aspect ratio of the primary content for co-display (e.g., a flash flood warning takes up a portion of the screen while the broadcast continues in another portion of the screen) by the service provider. In other aspects, the secondary content source 220 is used by the networks to insert the secondary content into the feeds comprising the primary content sources 210. The service provider may also use the secondary content source 220 to insert secondary content into the recorded content that was not present at the time the content item was recorded or reinsert secondary content that was stripped from the recording (e.g., the service provider may store a broadcast in the cDVR storage 230 without advertisements, and reinsert the advertisements from a secondary content source 220 on playback).

The cDVR storage 230 comprises the computer readable storage media on which content from the primary content source 210 is recorded in response to a consumer's request to record content. The present disclosure provides for the modular management of the cDVR storage 230, which may be practiced in addition to or instead of the service provider managing the cDVR storage 230 by consumer (allocating specific resources and storage space to a given consumer in a distributed system), by content item (allocating access to specific recordings by lists of consumers who requested to record the given content item), or by device (allocating a cDVR device for a given consumer or consumers).

In various aspects, the video client 250 is a software application that is executed on a network interface device 131 or an endpoint device 132 local to the consumer. For example, the video client 250 may be stored in a memory storage device associated with an STB to provide content and trick play options to the consumer via an associated television and control devices. In another example, the video client 250 may be stored in a memory storage device associated with a mobile device, such as, for example, a tablet, laptop, or smart phone, to enable the mobile device to receive content and manipulate that content via trick play options.

As will be understood by one of ordinary skill in the art, trick play options include playback modes and commands for content items that are offered in addition to the linear playback of a content item. Example trick play options include, but are not limited to: pause, record, fast forward (at various speeds), rewind (at various speeds), skip ahead (at various lengths of time), fall back (at various lengths of time), next chapter/scene, previous chapter/scene, set bookmark, jump to bookmark, slow motion, etc.

When a consumer requests to record a content item, for example by selecting a record trick play option via a remote control, playback controls in the video client 250 while viewing a content item, or scheduling its recording from an electronic program guide, the cDVR application server 240 is operable to receive the content from the primary content source 210, which may include embedded secondary content (e.g., a broadcast of a television show that includes advertisements), store the content in cDVR storage 230, and associate the stored content with the consumer for later retrieval.

When the record command is received by the cDVR application server 240, subscriber account (or sub-accounts for consumers under a subscriber account) storage limits are checked from an account database 260. The storage limits may be based on factors including, but not limited to: whether the subscriber account is subscribed to a dedicated storage amount (e.g., X minutes of programming, Y gigabytes of content, Z content items), how storage is allocated between sub-accounts within the subscriber account, and whether a la carte storage has been enabled. The account database 260 may also store permissions or restrictions for the subscriber account (or sub-account) to record given categories of content items or specific content items (e.g., via parental controls), account preferences (e.g., retention policies for recorded content), and billing information. Additionally, the cDVR application server 240 may be provided permissions or restrictions from recording content items by the primary content source 210 or within a tag or field of the content item (e.g., a premium cable channel may disable recording of its content, or content available as VOD maybe disabled from recording by the service provider).

The cDVR application server 240 will check the balance of the subscriber's storage space available (i.e., how much space is "free" to accept new recordings), and in various aspects will present the consumer will different options on how to proceed with recording the content item. For example, the cDVR application server 240 will estimate how much storage space it will take to record the content item, and if the consumer has a balance greater than or equal to the estimate, the content item may be recorded with no further input. In other aspects, the consumer may be prompted to set an expiration or auto-delete time for the content item regardless of the storage balance. In another example, a consumer who has not subscribed to the cDVR service, or whose subscription tier does not include enough storage space may be prompted to upgrade the service to include more cDVR space. In a further example, a consumer may enable a la carte recording by purchasing the temporary use of storage space for the recording or watching (or agreeing to watch) secondary content in exchange for the temporary use of the storage space. In a further example, when the consumer has sufficient storage space, but that space is not "free" due to a recorded content item being already stored in that space or another content item scheduled to be stored in that space at the time the recording will be made, the consumer may be prompted to set which content item(s) can be deleted or overwritten (and when) to free up storage space for the new content item.

The video client 250 may also know or track the storage limits for the accounts with which it associated, enabling the request to record to include the preferences of the consumer without having to be prompted by the cDVR application 240.

When a consumer requests recorded content to be played back, the cDVR application server 240 retrieves the indicated content from cDVR storage 230 and transmits it to the video client 250. In aspects where secondary content is stored separately from recorded primary content, the cDVR application server 240 may pull the secondary content from the secondary content source 220 for reinsertion (or new insertion) into the recorded primary content item. Additionally, the video client 250 or cDVR application server 240 may provide recorded or secondary content in a trick-play-disabled mode, such that trick play options are not available when the content is being played from the cDVR system 200, or with limited trick play options available (e.g., record disabled, only pause and rewind available). When trick play is disabled, the network interface device 131 may not transmit trick play commands or the cDVR application server 240 may ignore any trick play commands received. By reducing the amount of commands sent, or the implementation thereof, the service provider can reduce the use of bandwidth and processing resources expended to enable trick play on the consumer's video client 250.

Figure 3:
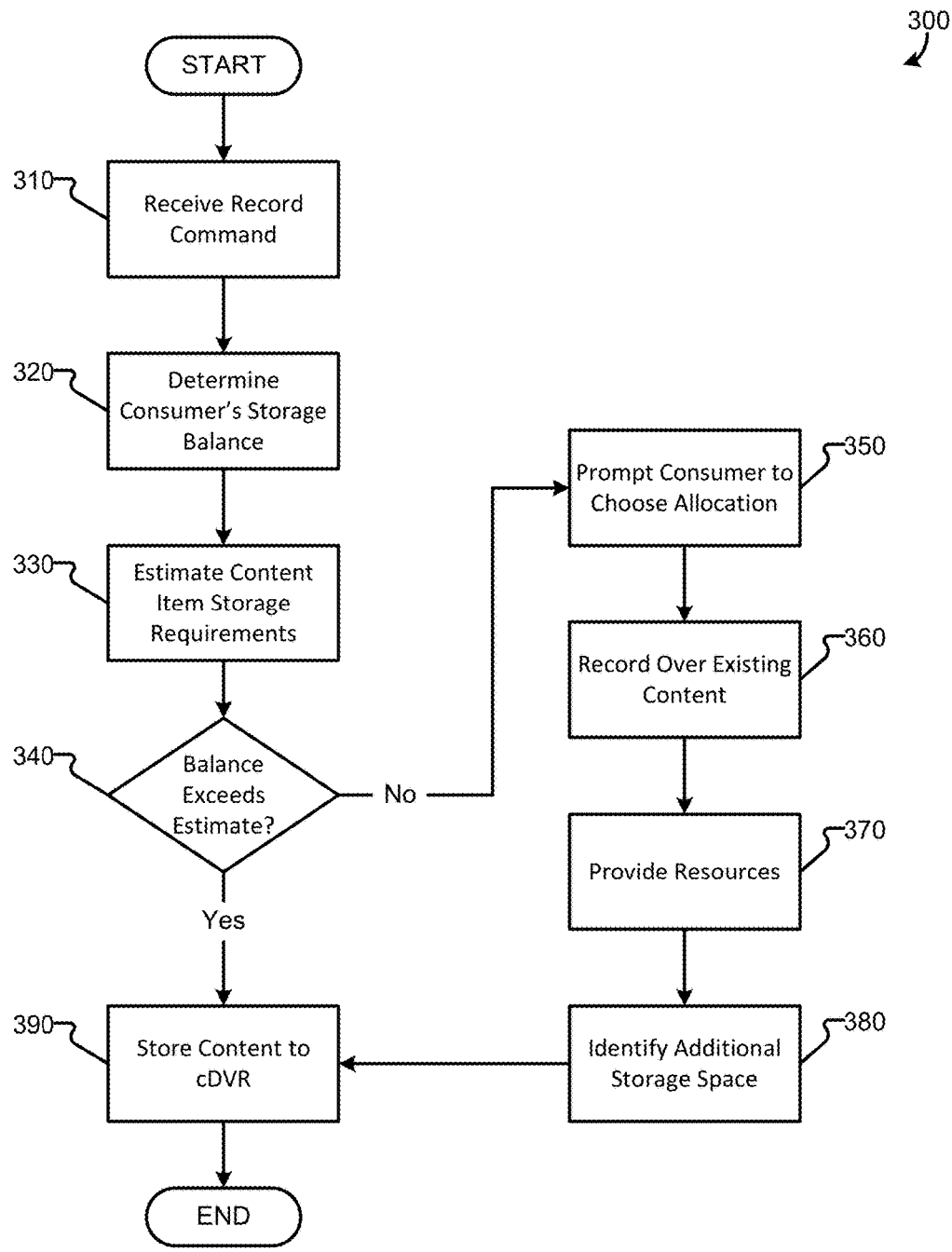
FIG. 3 is a flowchart illustrating general stages in an example method for providing consumers and service providers with an improved recording experience via triggering modular storage allocation in a cDVR.

FIG. 3 is a flowchart illustrating general stages in an example method 300 for providing consumers and service providers with an improved recording experience via triggering modular storage allocation in a cDVR. At OPERATION 310 a record command is received from a consumer by the service provider operating the cDVR system 200. Record commands are received when a trick play mode for recording is received or a scheduling command to record at a later time is received. A consumer may make record commands via a remote control device or companion device (e.g., a smart phone, a tablet, or a computer in communication with an endpoint device 132 or network interface device 131) while watching a content item, or via an application, web interface, or electronic programming guide in anticipation of a content item's broadcast.

Proceeding to OPERATION 320, the storage balance available to the consumer is determined, and at OPERATION 330 an estimate is made as to the storage requirements for the content item for which the consumer has requested recording. In various aspects, the storage balance available to the consumer is tracked via number of content items, length of time, or number of bytes, and the storage estimate will be made according to the same tracking system. For example, a balance may be tracked in terms of bytes available, such that if a consumer is allowed to record up to ten gigabytes of content and has recorded eight gigabytes of content (leaving two gigabytes available), then the estimation of the storage requirements will be in terms of how many bytes the content item to be recorded will take up. In another example, a balance may be tracked in terms of minutes of recording available, such that if a consumer is allowed to record up to ten hours of content and has recorded eight hours of content (leaving two hours available), then the estimation of the storage requirements will be in terms of how long the content item to be recorded will run for. Storage estimates may take into account user preferences for bit rates (e.g., highest available, lowest available, variable bit rate) and will use programming guide data or content item metadata to calculate an expected length of time that the content item will run for.

At DECISION 340 it is determined whether the balance exceeds the estimate. When it is determined that the balance will not be enough to record the content item, method 300 proceeds to OPERATION 350. When it is determined that the balance exceeds the estimate, and the storage space free for the consumer's use is sufficient to record the content item, method 300 proceeds to OPERATION 390. In various aspects, when a consumer is subscribed to a set amount of storage space, that space is not held unused; there is not a hard drive or a partition of a drive that is held exclusively for the consumer's use, but the storage space will (if requested) be provided to the consumer without the need to allocate further resources, and thus method 300 will proceed to OPERATION 390 instead of OPERATION 350.

At OPERATION 350 the consumer is prompted to choose an allocation of resources to enable the content item to be stored to the cDVR. For example, the consumer may have a menu or a pop-up dialog provided, similar to the dialog discussed in relation to FIG. 4, when the record command is initiated or when it is detected that additional storage space is needed to select one or more options for how the storage resources should be modularly found and applied. Depending on the preferences chosen for resource allocation, method 300 may proceed to one or more of OPERATIONS 360, 370, and 380 and then proceed to OPERATION 390. Alternatively, if the consumer chooses to not proceed with recording the content item (e.g., cancels the recording), method 300 will instead conclude without recording the content item or allocating resources for its storage.

Resource allocation via recording over other content items is performed at OPERATION 360 when selected by the consumer. The consumer may specify general categories or criteria by which the system will automatically overwrite existing content, may specify specific content items to overwrite, or the system may use the consumer's policies to provide an ordered list of content items that the consumer is most likely to overwrite from which the consumer may select individual content items. For example, a dialog may present a list of content items already recorded by the consumer from oldest to newest, largest space consumed to smallest space consumed, closest in size to the content item to record to most different in size, content items within a series (e.g., episode 1 of a program may be listed when episode X of that program is to be recorded), and combinations thereof that the consumer may select from to overwrite. The consumer may also cancel scheduled recordings that have not yet been recorded to the cDVR to ensure a newly selected content item is recorded in favor of the other to-be-recorded content item.

The consumer selects resources to provide to expand the available storage space at OPERATION 370. A consumer may expand the available storage space via upgrading a subscription tier (e.g., upgrading from X storage space to Y storage space as part of a service contract with greater storage space) or agree to a la carte storage space expansion. A la carte storage space is assigned modularly to the consumer based on the storage space needed to record the selected content item. For example, a consumer may select to have a small fee added to a monthly bill to record a program for a given period of time, or may agree to watch secondary content in exchange for additional storage space for a given period of time. Various options for the presentation of secondary content may be selected by the service provider or the consumer, which include disabling trick play for existing secondary content in the recorded content (e.g., so that commercials cannot be skipped), agreeing to the insertion of additional secondary content into the playback of the secondary content (e.g., agreeing to receive emergency notices during playback that did not originally include those notices but are relevant at the time of playback), and/or agreeing to view secondary content prior to the record command being accepted by the cDVR system 200. When the consumer has agreed to view additional secondary content during playback, it may be added at various trigger points in the recorded content item, which may reduce the processing resources needed by the video client 250 or the service provider to insert that content. For example, an emergency alert (e.g., a tornado warning) may be inserted into playback immediately when it is received, or the service provider may wait until a trigger point to insert the current emergency alert into the playback or override the previous secondary content. In various aspects, trigger points may correspond to the beginning or end of a commercial break from the original recording, an emergency alert in the original recording, a scene change in the content item, an I-frame in the video stream closest to at a set time in the content item, etc.

The service provider may adjust how resources are to be applied to provide for a la carte modular expansion of cDVR storage space, which may depend on the retention options, content size, and amount of expansion in storage to the balance needed. For example, when a consumer needs an additional gigabyte of storage, a charge of X may be applied to a subscriber account, and when a consumer needs an additional two gigabytes of storage, a charge of 2X may be applied to a subscriber account. Similarly, if a consumer elects to retain a content item for one week, a charge of X may be applied to a subscriber account, and when the consumer elects to retain the content item for two weeks, a charge of 2X may be applied to the subscriber account. To offset the charge, the consumer may elect to disable trick play during secondary content, reducing the charge by A, to enable the insertion of additional secondary content, reducing the charge by B, agreeing to consume segments of secondary content for one or more credits of C against the charge of X (down to a floor value, which may be zero in some aspects), reduce the quality of the content item, reduce the retention period, and combinations thereof. When a consumer elects to consume segments of secondary content, the service provider may include requests for feedback from the consumer to verify attentiveness (e.g., "press button X now") or decline to grant credit based on consumer conditions (e.g., if an endpoint device 132 volume is too low, the display is turned off, a consumer changes channels, picture-in-picture is enabled, etc.).

Additional storage space in the cDVR system 200 is identified for where to store the content item at OPERATION 380 so that if the consumer elected to provide resources to expand the amount of storage, the appropriate amount of storage space will be granted to them when needed. When a consumer is scheduling a recording for the future, storage space may be reserved for the consumer when resources have been properly applied by the consumer, but that storage space may be used by other consumers for other purposes (or may not exist in the cDVR system 200) until the content item is to be recorded. In various aspects, the estimates for recording a content item will be used by the cDVR system 200 in combination with the available space on various storage devices to fill unused spaces on those devices so that the devices will be filled closer to capacity. The cDVR system 200 will then track the content recorded on various storage devices, as well as the schedules for content to be recorded, and may adjust where (in a given storage device or within the cDVR system 200) scheduled content items are to be recorded. For example, a first content item recorded for a consumer may be stored on a first storage device and a second content item may be scheduled to be stored on a second storage device, but will be rescheduled to be stored on a third storage device if a second consumer schedules a recording of a content item that better fits the storage space on the second storage device (i.e., allows for less space on the storage device to go unused) or it is determined that the second content item will better fit on the third storage device. For example, a best fit for unused space on a storage device will seek to fill that unused space as completely as possible, wherein an unused space of 10 gigabytes will be better fit by a content item that is 9.9 gigabytes in size than a content item that is 9.8 gigabytes in size. As will be appreciated, the cDVR server 240 may know standard sizes that may be expected for various content items, such that if content items frequently are 4 gigabytes in size, the best fit for 10 gigabytes of unused storage space may be a 6 gigabyte file (in anticipation of recording a 4 gigabyte file) rather than the 9.9 gigabyte file given in the example above.

By enabling modular storage, a service provider may make more efficient use of the storage space in its cDVR system 200, by identifying storage media with available space and filling that space closer to capacity based on the modular demands of its consumers, thus allowing the service provider to use less equipment to provide the same or better service to consumers.

At OPERATION 390 the content item is stored to the cDVR, or the storage space needed for a later recording is noted and reserved for that time slot. In various aspects, the content item may be stored with or without secondary content, and its storage may include retention policies and access policies. For example, if a consumer records a content item from a premium channel for which the account has a subscription, but later drops that subscription, the recorded content item may marked with access policies so that it is deleted when the subscription to the premium channel is dropped or it will not be viewable by the consumer until the subscription is renewed. A consumer may also set retention polices via system preferences or at the time of recording so that the content item will be retained for a designated period of time (e.g., one day, one week, indefinitely) or number of viewings (e.g., delete after viewing one, delete after two viewings, store indefinitely). Method 300 may then conclude.

Figure 4:
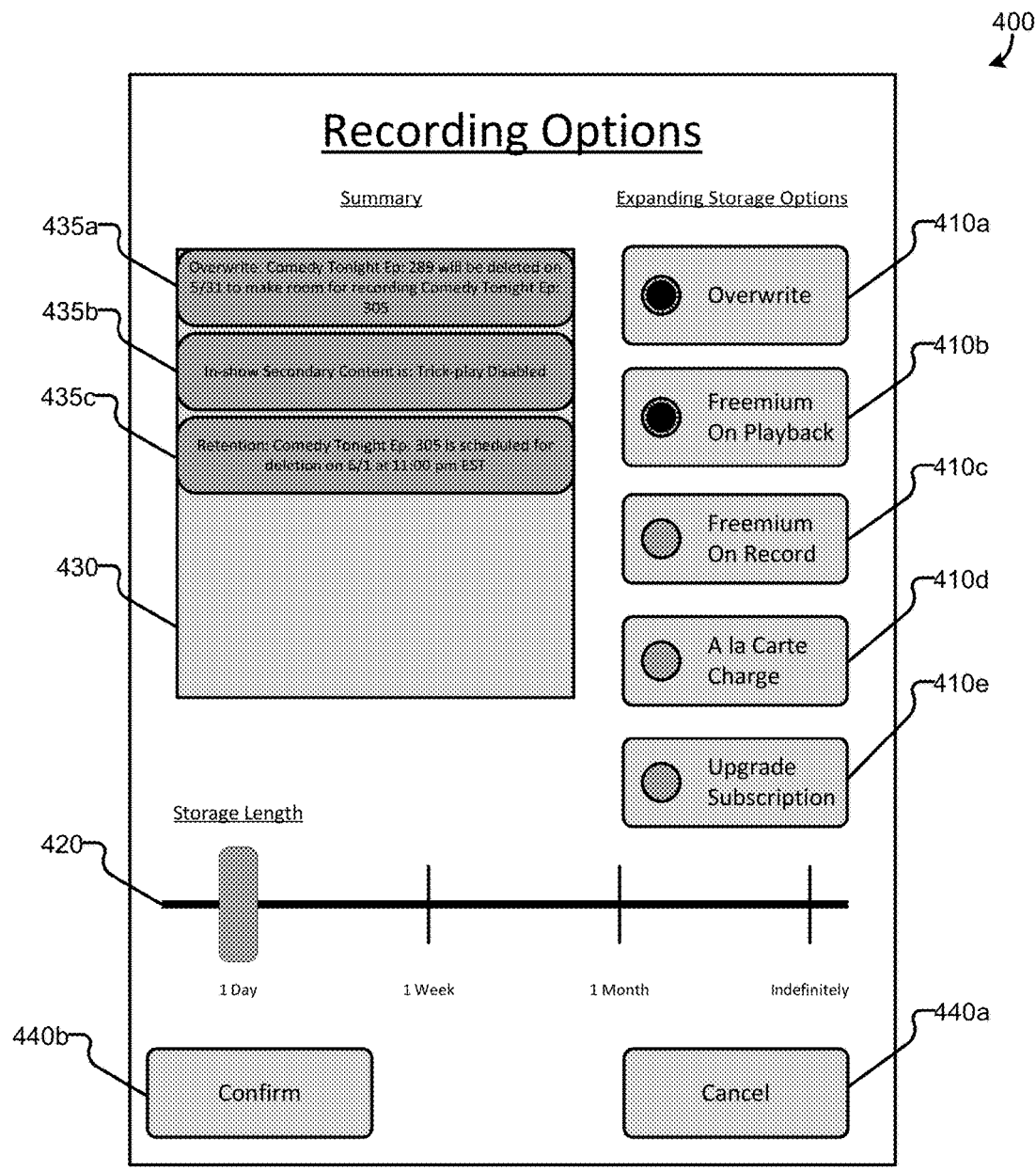
FIG. 4 illustrates an example user interface by which a consumer may select recording and retention preferences.

FIG. 4 illustrates an example user interface (UI) 400 by which a consumer may select recording and retention preferences. The consumer may be presented with the UI 400 as an overlay, as a side-by-side or sub-dialog with another dialog, or as a separate window, and it may be presented at each time a record command is made by a consumer or may be presented only when consumers wish to change their recording preferences. The UI 400 may be navigated via dedicated navigation buttons on a remote control device, by suborning the normal function of other buttons on a remote control device (e.g., using channel up/down and volume up/down to navigate the menu without changing the channel or volume), by voice commands, the use of a touchscreen of a companion device, as well as other methods available to the consumer.

Storage controls 410 (individually, storage controls 410a-e) enable the consumer to set preferences for how resources are to be allocated for storing the recorded content item. The storage controls 410 may be radio buttons, check boxes, switches, toggles, or other controls known to those of ordinary skill in the art. For example, an overwrite option control 410a may be a check box that when actuated will set a preference to overwrite existing content, which may prompt a sub-dialog for the consumer to choose content items to delete or set rules for the system to choose which content items to delete. Continuing the example, a freemium on playback control 410b, freemium on record control 410c, an a la carte charge control 410d, and an upgrade subscription control 410e may be radio buttons so that a consumer can select none or one of the options to indicate how to expand the available storage space for a given recording at the time the recording is made so that additional storage space may be added modularly for the consumer's use. As will be appreciated, other options for controls are possible, and a service provider may not offer all options to all consumers, such as, for example, an upgrade subscription control 410e may not be presented (or may be grayed out and not selectable) when the consumer already has the highest tier subscription or only overwrite control 410a is presented when a maximum storage threshold for the cDVR system 200 or the specific consumer/subscriber account is reached.

Retention policy control 420 is illustrated as a slider bar in FIG. 4, but in other aspects different control types (e.g., radio buttons, text box, wheel, drop down menu) may be used. Although four options are shown in the illustrated example of a retention policy control 420 for how long to retain a recorded content item in the cDVR, one of ordinary skill in the art will appreciated that aspects may present more or fewer options.

Via the retention policy control 420, a consumer will set, at or before the time of recording, how long the content item is to be retained in the cDVR system 200 before it is deleted or is available to be overwritten. In various aspects, if the content item is available to be overwritten, it will no longer be available to the consumer to view, even if it is still present on the computer-readable storage media of the cDVR system 200. In additional aspects, content items may be made unavailable when the consumer's access to the source of that content item lapses. For example, if a consumer who subscribed to premium service records a content item from a premium channel, but lets the subscription lapse and reverts to basic service, the premium content item will no longer be available to the consumer to play back. In some aspects, the unavailable premium content may be deleted or made available to be overwritten regardless of the originally set retention policy, while in other aspects, the premium content item will be retained according to the retention policy so that if the consumer resumes the premium subscription, the premium content item will be made available again.

Summary box 430 provides the consumer with a summary of the actions that will be taken, and when they will be taken, when a recording is made. The summary box 430 is illustrated as including one or more action summaries 435 (individually, action summaries 435a-c) that break the actions to be taken into smaller summaries. For example, first action summary 435a may describe what content items will be overwritten to record the present content item, second action summary 435b may describe secondary content items regarding the playback of the recorded content item, and third action summary 435c may describe the retention policy for the content item. As will be appreciated, more or fewer action summaries 435 may be provided in alternate aspects that discuss different actions to be taken in regard to a recording.

The UI also includes dialog controls 440, such as a cancel control 440a and a confirm control 440b, which enable a consumer to respectively cancel the recording or scheduling of a recording, or start or schedule the recording with the currently selected option. When a consumer actuates a dialog control 440, the UI may then be closed.

Figure 5:
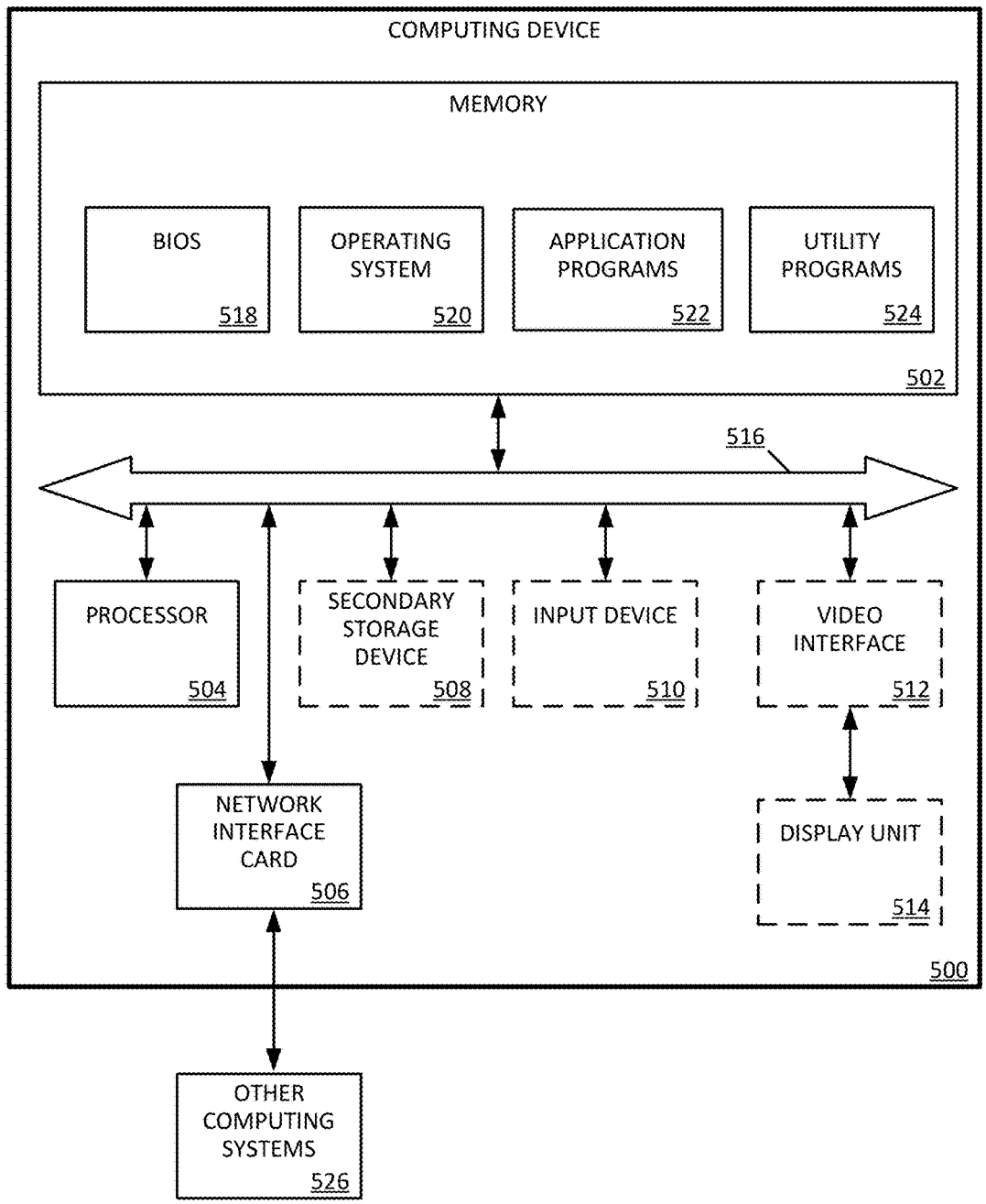
FIG. 5 is a block diagram illustrating example physical components of a computing device with which embodiments of the present disclosure may be practiced.

FIG. 5 is a block diagram illustrating example physical components of a computing device 500 with which embodiments of the present disclosure may be practiced. In some embodiments, one or a combination of the components of the cDVR system 200 are implemented using one or more computing devices like the computing device 500. It should be appreciated that in other embodiments, one or a combination of the components of the cDVR system 200 may be implemented using computing devices having hardware components other than those illustrated in the example of FIG. 5.

Computing devices may be implemented in different ways in different embodiments. For instance, in the example of FIG. 5, the computing device includes a memory 502, a processor 504, a network interface 506, an optional secondary storage device 508, an input device 510, a video interface 512, communicated with a display unit 514, and a communications medium 516. In other embodiments, the computing device 500 may be implemented using more or fewer hardware components or in combination with other types of computer systems and program modules.

The memory 502 includes one or more computer-readable storage media capable of storing data or computer-executable instructions that, when executed by processor 504, provide functionalities as described herein. In various embodiments, the memory 502 is implemented in various ways. For example, the memory 502 can be implemented as various types of computer-readable storage media, which are articles of manufacture used to store various types of data or software instructions. For instance, in the example of FIG. 5, the memory 502 stores a Basic Input/Output System (BIOS) 518 and an operating system 520. The BIOS 518 includes a set of software instructions that, when executed by the processor 504, cause the computing device 500 to boot up. The operating system 520 includes a set of software instructions that, when executed by the processor 504, cause the computing device 500 to provide an operating system that coordinates the activities and sharing of resources of the computing device 500. The memory 502 also stores one or more application programs 522 that, when executed by the processing system 504, cause the computing device 500 to provide applications to users. The memory 502 also stores one or more utility programs 524 that, when executed by the processor 504, cause the computing device 500 to provide utilities to other software programs.

The optional secondary storage device 508 includes one or more computer-readable storage media, and may store data and computer-executable instructions not directly accessible by the processor 504. That is, the processor 504 performs an I/O operation to retrieve data or computer-executable instructions from the secondary storage device 508. In various embodiments, the secondary storage device 508 can be implemented as various types of computer-readable storage media, such as by one or more magnetic disks, magnetic tape drives, CD-ROM discs, DVD-ROM discs, BLU-RAY discs, solid state memory devices, or other types of computer-readable storage media.

The processor 504 includes one or more processing units, which may include tangible integrated circuits that selectively execute computer-executable instructions. In various embodiments, the processing units in the processor 504 are implemented in various ways. For example, the processing units can be implemented as one or more processing cores. In another example, the processor 504 can comprise one or more separate microprocessors. In yet another example, the processor 504 can comprise Application-Specific Integrated Circuits (ASICs) that provide specific functionality. In yet another example, the processor 504 provides specific functionality by using an ASIC and by executing computer-executable instructions.

The computing device 500 may be enabled to send data to, and receive data from, a communication network via a network interface 506. In different embodiments, the network interface 506 is implemented in different ways, such as an Ethernet interface, a token-ring network interface, a fiber optic network interface, a wireless network interface (e.g., Wi-Fi, Wi-Max, etc.), or another type of network interface. The network interface 506 enables the computing device 500 to communicate with other computing systems 526, such as over a wireless network in a distributed computing environment, a satellite link, a cellular link, and comparable mechanisms. Other devices may include computer device(s) 500 that execute communication applications, storage servers, and comparable devices.

The optional input device 510 enables the computing device 500 to receive input from a user. Example types of input devices 510 include, but are not limited to: keyboards, mice, trackballs, stylus input devices, keypads, microphones, joysticks, touch-sensitive display screens, and other types of devices that provide user input to the computing device 500.

The optional video interface 512 outputs video information to an optional display unit 514. In different embodiments, the video interface 512 is implemented in different ways. For example, the video interface 512 may be a video expansion card. In another example, the video interface 512 is integrated into a motherboard of the computing device 500. In various aspects, the display unit 514 can be an LCD display panel, a touch-sensitive display panel, an LED screen, a projector, a cathode-ray tube display, or another type of visual display device. In various embodiments, the video interface 512 communicates with the display unit 514 in various ways. For example, the video interface 512 can communicate with the display unit 514 via a Universal Serial Bus (USB) connector, a VGA connector, a digital visual interface (DVI) connector, an S-Video connector, a High-Definition Multimedia Interface (HDMI) connector, a DisplayPort connector, or another type of connection.

The communications medium 516 facilitates communication among the hardware components of the computing device 500. In different embodiments, the communications medium 516 facilitates communication among different components of the computing device 500. For instance, in the example of FIG. 5, the communications medium 516 facilitates communication among the memory 502, the processor 504, the network interface 506, the secondary storage device 508, the input device 510, and the video interface 512. In different embodiments, the communications medium 516 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of transmission medium.

Embodiments of the present disclosure may be used in various distributed computing environments where tasks are performed by remote processing devices that are linked through a communications network in a distributed computing environment.

Examples and aspects are described above with reference to block diagrams or operational illustrations of methods, systems, and devices. The functions/acts noted in the blocks may occur out of the order as shown in any flowchart or described herein with reference to FIG. 3. For example, two processes shown or described in succession may in fact be executed substantially concurrently or the blocks may sometimes be executed in the reverse order, depending upon the functionality/acts involved. Similarly, the component articles of manufacture illustrated in the diagrams of systems and devices described herein may be rearranged, reordered, multiplied, or (depending on the functionalities involved) be implemented by more or fewer components than illustrated.

While certain examples and aspects have been described, other examples and aspects may exist. The foregoing description of the exemplary aspects has been presented for the purposes of illustration and description. It is not intended to be exhaustive or to limit the present disclosure to the precise form disclosed. Many modifications and variations are possible in light of the above teaching. It is intended that the scope of the present disclosure be limited not with this detailed description, but rather by the claims appended hereto.

We claim:

1. A system for triggering modular storage allocation in a cloud Digital Video Recorder (cDVR) system, comprising:
   a primary content source, operable to provide video content in conjunction with a content delivery network (CDN);
   a cDVR storage, operable to store the video content in conjunction with the CDN;
   an account database, operable to store consumer preferences for recording and retaining the video content, including an amount of storage space available to each consumer, wherein the consumer preferences comprise an agreement with a consumer to watch an amount of secondary content before modularly expanding the storage space available to the consumer in order to record a content item for the consumer; and
   a cDVR application server, in communication with the primary content source, the cDVR storage, and an endpoint device running a video client, wherein the cDVR application server receives content access and record requests from the video client and receives trick play commands from the video client;

wherein the cDVR application server is operable to receive a command associated with a record request from the video client to record the content item for the consumer;

wherein the cDVR application server is operable to, in response to the command associated with the record request from the video client to record the content item, determine whether to store the content item in the cDVR storage received from the primary content source according to the amount of storage space available to the consumer and the consumer preferences including the agreement with the consumer to watch the amount of secondary content before modularly expanding the storage space to record the content item;

wherein the cDVR application server is operable to determine when the amount of storage space available to the consumer is exceeded and, in response to the consumer watching the amount of secondary content before modularly expanding the storage space available to the consumer to record the content item according to the agreement with the consumer to watch the amount of secondary content, modularly expand the storage space available to the consumer to enable storing the content item in the cDVR system according to the storage space needed to record the content item.

2. The system of claim 1, further comprising:
a secondary content source, operable to provide secondary content in conjunction with the CDN;
wherein the cDVR application server is in communication with the secondary content source;
wherein the consumer preferences indicate that the consumer agrees to watch secondary content in exchange for modularly expanding the storage space available to the consumer.

3. The system of claim 2, wherein the consumer preferences specify for how long to retain the content item in the cDVR storage which affects an amount of secondary content that the consumer agrees to watch, wherein longer times to retain the content item correspond to larger amounts.

4. The system of claim 2, wherein the agreement to watch secondary content is chosen by the consumer from at least one of:
an agreement to watch a secondary content item before the record command is accepted by the cDVR system, wherein the cDVR system transmits the secondary content item from the secondary content source in response to receiving a confirmation from the consumer;
an agreement to watch the secondary content item during playback of the content item which is to be recorded and wherein the cDVR system transmits the secondary content item which is newly added to the content item for playback in addition to the secondary content presented at the time of recording in response to a trigger in the content item; and
an agreement to watch the content item wherein trick play commands are disabled during the playback of the content item when the secondary content item is provided to the consumer.

5. The system of claim 2, wherein the cDVR application server stores primary content comprising the content item in the cDVR storage without secondary content comprising the content item and is operable to retrieve a secondary content item from the secondary content source for reinsertion into the content item on playback to the video client.

6. The system of claim 2, wherein the secondary content comprises emergency alerts applicable at playback that were not recorded with the content item.

7. The system of claim 1, wherein to modularly expand the storage space available to the consumer further comprises locating a storage space having a best fit for the content item to minimize unused space on storage devices comprising the cDVR storage.

8. A method for triggering modular storage allocation in a cloud Digital Video Recorder (cDVR) system, comprising:
receiving, at a cDVR application server of the cDVR system, a record command associated with a record request from a video client indicating a content item to record to the cDVR system for a consumer;
in response to receiving the record command at the cDVR application server:
determining a storage balance available to the consumer in the cDVR system;
estimating a storage requirement for the content item;
determining whether the storage requirement exceeds the storage balance; and
when it is determined that the storage requirement exceeds the storage balance, triggering the modular storage allocation, further comprising:
receiving a consumer preference for allocating resources to expand the storage balance according to an amount of storage space available to the consumer, wherein the consumer preference comprises an agreement with the consumer to watch an amount of secondary content before modularly expanding the storage space available to the consumer in order to record the content item for the consumer;
identifying an additional storage space in the cDVR system sufficient to store the content item; and
in response to the consumer watching the amount of secondary content before modularly expanding the storage space available to the consumer to record the content item according to the agreement with the consumer to watch the amount of secondary content, modularly expanding the storage space available to the consumer to include the additional storage space in the cDVR system sufficient to store the content item and storing the content item to the additional storage space in the cDVR system.

9. The method of claim 8, wherein the consumer preference further comprises assuming a la carte charges to store the content item, wherein the cDVR system transmits a secondary content item to the consumer before the record command is accepted by the cDVR system.

10. The method of claim 8, wherein the cDVR system transmits a secondary content item during playback of the content item and the secondary content item is newly added to the content item for playback.

11. The method of claim 8, wherein trick play commands are disabled during the playback of content item when a secondary content item is provided to the consumer.

12. The method of claim 8, wherein storing the content item to the cDVR system further comprises storing a primary content comprising the content item separately from secondary content comprising the content item.

13. The method of claim 8, wherein triggering the modular storage allocation further comprises determining an overwrite preference for the consumer, wherein the overwrite preference specifies recorded content items to overwrite to allocate the storage space for the content item.

14. The method of claim 13 wherein the recorded content items include scheduled content items-not yet recorded to the cDVR system.

15. The method of claim 8, wherein the record command includes a retention preference from the consumer for how long the content item is to be retained in the cDVR.

16. The method of claim 8, wherein the additional storage space in the cDVR system is located on a different storage device comprising the cDVR system from a second content item stored for the consumer in the cDVR system.

17. The method of claim 8, wherein the record command and allocating resources to allocate the storage balance occur simultaneously.

18. A system for triggering modular storage allocation in a cloud Digital Video Recorder (cDVR) system, comprising:
 a processor; and
 computer readable storage media including instructions, which when executed by the processor enable the cDVR system to provide a cDVR application server, operable to:
  receive a record command associated with a record request from a video client indicating a content item to record to the cDVR system for a consumer;
  in response to receiving the record command at the cDVR application server:
   determine a storage balance available to the consumer in the cDVR system;
   estimate a storage requirement for the content item;
   determine whether the storage requirement exceeds the storage balance; and
   when it is determined that the storage requirement exceeds the storage balance, trigger the modular storage allocation, further to:
    identify a consumer preference for allocating resources to expand the storage balance according to an amount of storage space available to the consumer, wherein the consumer preference comprises an agreement with the consumer to watch an amount of secondary content before modularly expanding the storage space available to the consumer in order to record the content item for the consumer, wherein the cDVR system operates to:
     transmit the amount of secondary content according to the consumer preference to the consumer before the record command is accepted by the cDVR system;
     transmit the secondary content during playback of the content item which is to be recorded and the secondary content is newly added to the content item for playback; and
     disable trick play commands during the playback of content item when the secondary content is provided to the consumer;
    identify an additional storage space in the cDVR system sufficient to store the content item; and
    in response to the consumer watching the amount of secondary content before modularly expanding the storage space available to the consumer to record the content item according to the agreement with the consumer to watch the amount of secondary content, modularly expand the storage space available to the consumer to include the additional storage space in the cDVR system sufficient to store the content item and store the content item to the additional storage space in the cDVR system.

19. The system of claim 18, wherein the additional storage space in the cDVR system is located on a different storage device comprising the cDVR system from a second content item stored for the consumer in the cDVR system.

20. The system of claim 18, wherein the additional storage space in the cDVR system is chosen based on a best fit on a destined storage device, wherein the best fit minimizes unused space on the destined storage device.

* * * * *